United States Patent [19]
Frank et al.

[11] Patent Number: 5,954,827
[45] Date of Patent: Sep. 21, 1999

[54] METHOD AND SYSTEM FOR INDICATING COMPUTER STATUS

[75] Inventors: Jonathan P. Frank, Boise, Id.; Jeffery J. Leyda, Minneapolis, Minn.; Robert D. Magette, Nampa, Id.

[73] Assignee: Micron Electronics, Inc., Nampa, Id.

[21] Appl. No.: 08/872,011

[22] Filed: Jun. 9, 1997

Related U.S. Application Data

[62] Division of application No. 08/772,357, Dec. 23, 1996.

[51] Int. Cl.$^6$ .................................................. G06F 10/00
[52] U.S. Cl. ............................... 714/48; 714/46; 714/47; 714/25
[58] Field of Search ..................... 395/183.22, 183.01, 395/184.01, 185.01

[56] References Cited

U.S. PATENT DOCUMENTS

| | | | |
|---|---|---|---|
| 3,725,872 | 4/1973 | Bologh, Jr. et al. | 340/172.5 |
| 3,748,650 | 7/1973 | Garcia et al. | 340/172.5 |
| 3,999,126 | 12/1976 | Gabor | 324/135 |
| 4,633,167 | 12/1986 | Kitts | 324/556 |
| 4,890,102 | 12/1989 | Oliver | 340/825.17 |
| 5,020,011 | 5/1991 | Stark et al. | 364/580 |
| 5,081,627 | 1/1992 | Yu | 395/183.22 |
| 5,133,055 | 7/1992 | Lieberman et al. | 395/275 |
| 5,225,816 | 7/1993 | Lebby et al. | 340/653 |
| 5,327,435 | 7/1994 | Warchol | 395/183.12 |
| 5,353,240 | 10/1994 | Mallory et al. | 364/552 |
| 5,357,519 | 10/1994 | Martin et al. | 395/183.01 |
| 5,432,715 | 7/1995 | Shigematsu et al. | 364/551.01 |
| 5,519,832 | 5/1996 | Warchol | 395/183.22 |

*Primary Examiner*—Ly V. Hua
*Attorney, Agent, or Firm*—Knobbe, Martens, Olson & Bear, LLP

[57] ABSTRACT

A monitor system for computer equipment under test comprising a system monitor in communication with a storage element and a status indicator. The system monitor scans video memory for values indicative of a pass, fail or test in progress condition. The system monitor also determines if the computer equipment has failed to respond to testing resulting in a locked up "frozen" condition. The status indicator communicates with an external port of the computer equipment to receive and display signals from the system monitor indicative of the test status. In addition, when the computer equipment fails to respond to testing, the system monitor communicates with a storage element to capture detailed information related to the condition of the computer equipment. The storage element may reside within the computer equipment under test or may be distributed across a local or wide area network in communication with the computer equipment under test.

11 Claims, 4 Drawing Sheets

```
Parallel Port DB25-Female pin    assignment     pin    assignment
1      -Strobe        2      Data 0
3      Data 1         4      Data 2
5      Data 3         6      Data 4
7      Data 5         8      Data 6
9      Data 7         10     -Ack
11     Busy           12     Paper Empty
13     Select         14     -Auto Feed
15     -Error         16     -Init
17     -Slct in       18     GND
19     GND            20     GND
21     GND            22     GND
23     GND            24     GND
25     GND DB25 Male .\1  2  3  4  5  7  8  .......13/
..\14 15 16 17 18.......25/    Bottom View
....
```

METHOD AND SYSTEM FOR INDICATING COMPUTER STATUS

RELATED APPLICATIONS

This application is a divisional of U.S. patent application Ser. No. 08/772,357, filed Dec. 23, 1996.

METHOD AND SYSTEM FOR INDICATING COMPUTER STATUS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to the testing of computing equipment, and more particularly, to a method and system for indicating the status of computer equipment during burn-in testing.

2. Description of the Related Technology

During the manufacture of computers, the manufacturer assembles and interconnects a variety of components, such as a motherboard, a floppy disk drive, a hard disk drive, a video card and a power supply, into a case. At the end of the assembly operations, the manufacturer conducts a series of tests on the finished computers to determine if they are ready to ship to customers. Often, manufacturers include a burn-in test of the finished computer system to improve the reliability of the systems and to reduce the number of "dead on arrival" (DOA) systems received by the customers.

A burn-in test of the finished system eliminates those systems with a high infant mortality. This is because the failure rate of electrical components in a computer system often follows a so-called "bathtub" curve. In the bathtub curve, there are three regions. The first region corresponds to a high failure rate due to infant mortality. The second region corresponds to a low failure rate and includes the useful operating life of an electrical component. Lastly, the third region corresponds to a high failure rate associated with lifetime failures due to wear out and break down of components. Thus, manufacturers use a burn-in test to place systems in the second region, corresponding to the useful life of the computer, where there is a low failure rate.

To perform the burn-in test, a manufacturer often loads a finished computer with various proprietary test and diagnostic software programs to test the system components. The test and diagnostic programs often display test status and results on a display connected to the computer. Thus, during the test, a manufacturing operator must periodically check the display to determine (i) if the test is still in progress or (ii) if the system has passed the test or (iii) if the system has failed the test. For high volume manufacturing operations, large numbers of expensive computer displays are required to perform these tests. Computer manufacturers must incur additional costs for factory floorspace occupied by these expensive computer displays. Moreover, the computer manufacturer may also lose profits on the portion of its otherwise salable displays that are set aside for use in burn-in testing.

To reduce the costs described above, computer manufacturers have used mechanisms other than a computer display to display test results. For example, U.S. Pat. No. 5,353,240, assigned to Dell USA, discloses a boot test apparatus which can temporarily couple to one or more existing ports on the computer, conduct a boot test on the computer and indicate to an operator, using a plurality of light emitting diodes or a cathode ray tube, whether the computer has passed or failed the test. Similarly, the use of a console panel having LEDs to indicate failure of a module in a computer system having one or more CPU modules, an I/O module and one or more memory modules is disclosed in U.S. Pat. No. 5,519,832, assigned to Digital Equipment Corporation. Lastly, U.S. Pat. No. 5,225,816, assigned to Motorola, Inc., discloses an electrical connector having electronics mounted therein to connect an information bus to an electrical component and to provide a visual display indicating the flow of information through the bus. However, these mechanisms for displaying test results can not substitute for a computer display used in burn-in without modifications to the proprietary test and diagnostic software. Similarly, although each of these mechanisms may detect and indicate a failure, they do not capture information related to failure modes and conditions normally displayed on a display. Thus, to improve their profitability and manufacturing efficiency, computer manufacturers require a mechanism that performs the function of the computer displays during testing without their associated costs.

SUMMARY OF THE INVENTION

The present invention provides an efficient and cost-effective mechanism to display the status of computer equipment under test by eliminating the need for an expensive computer display. In addition, the present invention improves manufacturing efficiency by enabling the use of existing proprietary test and diagnostic software programs without modification. The monitor system of the present invention comprises a system monitor in communication with a storage element and a status indicator. During testing, the system monitor is executed in the computer equipment to monitor video memory locations for values indicative of a pass, fail or test in progress condition. The system monitor likewise determines if the computer equipment has failed to respond to a test resulting in a locked up "frozen" condition. The status indicator communicates with an external port of the computer equipment under test to receive and display signals from the system monitor indicating the status of testing. In this manner, the present invention replaces the expensive computer display with an inexpensive status indicator. Moreover, when the computer equipment has failed to respond to a test, the system monitor communicates with a storage element to capture detailed information related to the condition of the computer equipment. Thus, a manufacturer may analyze this detailed information at a later time to identify the failure modes and to prevent further failures due to these failure modes. Lastly, the storage element may reside within the computer equipment under test or may be distributed across a local or wide area network in communication with the computer equipment under test.

BRIEF DESCRIPTION OF THE DRAWINGS

FIG. 3a is a schematic diagram of a preferred embodiment of the status indicator of FIG. 1b.

FIG. 3b is a table illustrating the standard pin assignments for a parallel port having a DB-25 female connector corresponding to the status indicator of FIG. 3a.

DETAILED DESCRIPTION OF THE PREFERRED EMBODIMENT

The following detailed description of the preferred embodiments presents a description of certain specific embodiments to assist in understanding the claims. However, one may practice the present invention in a multitude of different embodiments as defined and covered by the claims.

Figure 1:
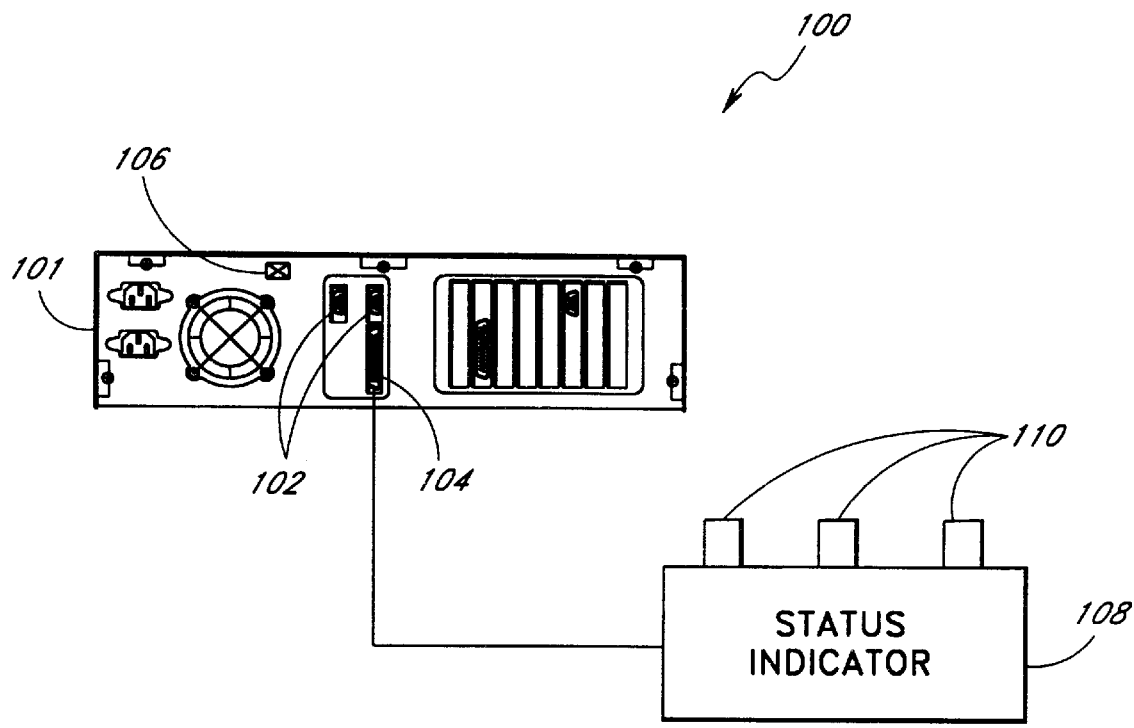
FIG. 1 is a perspective illustration of a preferred embodiment of a status indicator for practicing the present invention, shown as connected in a system under test.

Referring initially to FIG. 1, a system under test (SUT) 100 comprises various computer equipment 101 including, for example, personal computers, such as the Micron™ Millenia™, IBM® Aptiva™, Dell® Dimension™ and Compaq® Deskpro®; portable computers, such as the Micron™ Millenia Transport™, IBM ThinkPad®, Toshiba Portege™ and Compaq® LTE® 5000; and server computers, such as the Compaq® Proliant® and the Micron™ PowerServer. Generally, the SUT 100 includes input/output ports, such as a serial port 102, a parallel port 104 and an infrared port 106. The location of the input/output ports on the SUT 100 is arbitrary. For example, desktop and server computers have serial ports 102 and a parallel port 104 in the rear panel whereas notebook and laptop computers often have two infrared ports 106, one located in the front panel and one located in the rear panel.

In a preferred embodiment, a status indicator 108 having visual display elements 110 communicates with the SUT 100 via an input/output port 102, 104, 106. The status indicator 108 may communicate with an input/output port 102, 104, 106 via an electrical or a wireless connection to the port. Note that the status indicator 108 may communicate with any input/output port of the SUT 100, including PC Card® slots in notebook and laptop computers as well as the Universal Serial Bus (USB), a replacement for the serial ports 102 and the parallel port 104. In the preferred embodiment, the visual display elements 110 comprise red, green and yellow light emitting diodes (LED). The red LED indicates that the SUT 100 has failed the burn-in tests or that the SUT 100 is in a locked-up or "frozen" state. Similarly, the green LED indicates that the SUT 100 has passed the burn-in tests while the yellow LED indicates that the burn-in test is in progress.

Figure 2:
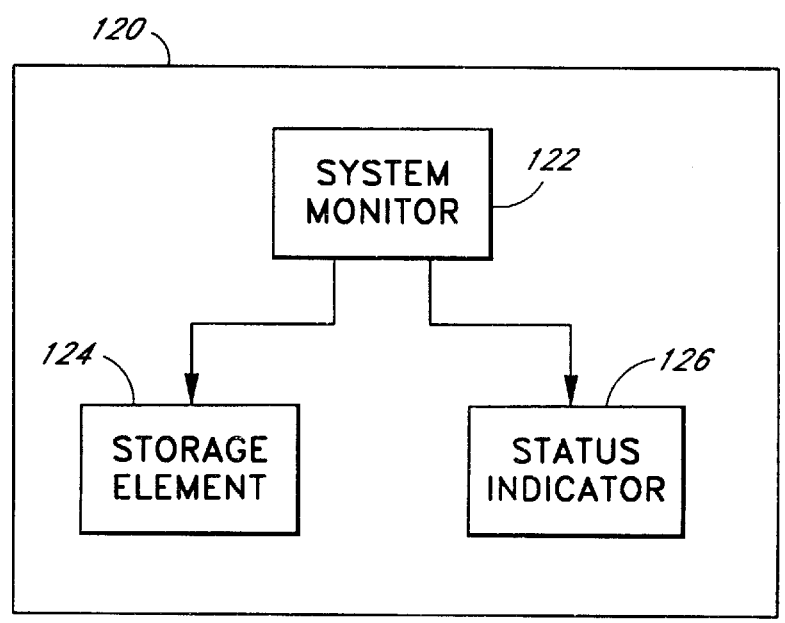
FIG. 2 is a block diagram illustrating the structure of a monitor system for practicing the present invention.

FIG. 2 illustrates the structure of a monitor system 120 of the present invention. The monitor system 120 includes a system monitor 122 in communication with a storage element 124 and a status indicator 126. In a preferred embodiment, the system monitor 122 is a MS-DOS® terminate and stay resident program (TSR) that monitors the video memory of the SUT 100 and provides signals to the status indicator 126 indicative of the burn-in status of the SUT 100. A terminate and stay resident program (TSR) is a program running under MS-DOS® that remains loaded in memory even when it is not running so that it can be quickly invoked to perform a specific task while any other application program is running. MS-DOS® is an operating system loaded in the memory of the SUT 100 responsible for controlling the allocation and usage of hardware resources such as memory, central processing unit time, disk space and peripheral devices. MS-DOS® is a single-tasking, single-user operating system with a command line interface. However, the system monitor 122 may be implemented in other popular operating systems, such as the Macintosh® OS, OS/2®, Windows®, Windows® 95, Windows NT® and Unix.

The system monitor 122 likewise determines if the SUT 100 has taken longer than a predetermined time to complete a burn-in test. In addition, the system monitor 122 determines if the SUT 100 has failed to respond to a burn-in test, that is, if the SUT 100 is in a locked-up or "frozen" state. For example, the system monitor 122 may monitor selected video memory locations where burn-in test software writes information for display on a video monitor. If the values in these video memory locations have not changed within a predetermined time period, then the system monitor 122 determines that the SUT 100 is in a locked-up or "frozen state." Moreover, if the SUT 100 is in a locked-up or "frozen" state, the system monitor 122 captures detailed information from the video memory of the SUT 100 and stores them in a storage element 124. A more detailed description of how these determinations are made is presented hereafter with reference to FIG. 4. Note that the video memory locations captured to the storage element 124 correspond to regions for display of the detailed information on a monitor previously used in the burn-in testing. A more detailed description of how these determinations are made is presented hereafter with reference to FIG. 5.

In a preferred embodiment, the storage element 124 comprises one or more storage devices residing within the SUT 100, such as a magnetic tape drive, a magnetic hard or floppy disk drive, an optical disk drive or a flash memory card. For example, the system monitor 122 may capture detailed information indicative of the failure mode from the video memory of the SUT 100 and write this information into a hard disk drive or a floppy disk drive of the SUT 100. In another preferred embodiment, the storage element 124 comprises one or more storage devices distributed across a local area network (LAN) of computing devices (LAN) or across a wide area network (WAN) of computing devices communicating with the SUT 100.

A LAN is a group of computers and other devices, such as laser printers and hard disk storage devices, dispersed over a relatively limited area and connected by a communications link that enables any device to interact with any other on the network. A WAN is a communications network that connects a group of LANs. In this preferred embodiment, the system monitor 122 captures detailed information indicative of the failure mode from the video memory of the SUT 100 and writes this information into a storage device located on the LAN or WAN.

Use of the LAN or WAN storage devices as a storage element 124 enables a computer manufacturer to capture detailed failure information for a SUT 100 having no internal non-volatile storage, such as a network, or Web, computer. Such a network computer typically includes a processor, an input device, such as an electronic pen, keyboard and pointing device, a display for rendering pages from a network, such as the World Wide Web portion of the Internet, volatile memory, such as DRAM, and an input/output port for communication. Upon capturing information indicative of the failure mode to the storage element 124, the computer manufacturer may analyze the failure mode information at a later time to understand the nature of the failure and, to the extent possible, to prevent future failures of the SUT 100 by this failure mode.

Figures 3A, 3B:
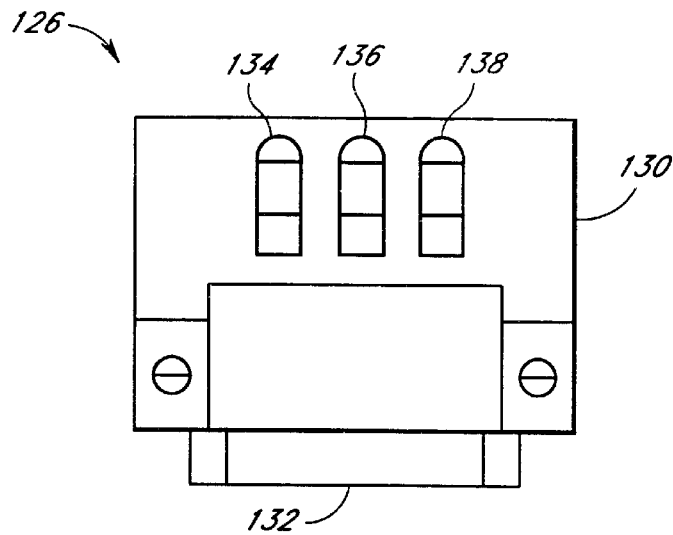

Referring now to FIG. 3a, a top view of a preferred embodiment of the status indicator 126 is illustrated. The status indicator 126 includes a body 130 having a port connector 132 and visual display elements 134, 136, 138 disposed on the body 130 in a location that maximizes their visibility to a manufacturing operator when the port connector 132 is coupled to a parallel port 104 (FIG. 1) of a SUT 100 (FIG. 1) during burn-in testing. Note that, in the preferred embodiment, the visual display elements 134, 136, 138 correspond to the colors green, yellow and red, respectively. However, the order of the colors displayed as well as the colors used are arbitrary. For example, a computer manufacturer may choose to use one or more visual display elements of any color and to dispose the visual display elements on the body 130 of the status indicator 126 in any order that is convenient and conducive to the efficient burn-in testing of a SUT 100 (FIG. 1).

In this preferred embodiment, the port connector 132 comprises a DB-25 male connector. A DB connector is any of several types of connectors used to facilitate serial and parallel input and output The number following the initials DB (Data Bus) indicates the number of lines within the connector. For example, a DB-25 connector can support up to twenty five separate lines, each of which can be connected to a pin on the connector. In practice, not all pins have an assigned function, and these unassigned pins are therefore generally not used. Common DB connectors include the DB-9, DB-15, DB-19, DB-25, DB-37 and DB-50 connectors.

In a preferred embodiment, the port connector 132 comprises a DB-25 male connector for coupling to the parallel port 104 (FIG. 1) of the SUT 100 (FIG. 1). In another preferred embodiment, the port connector 132 comprises a DB-9 female connector for coupling to a serial port 102 (FIG. 1) of the SUT 100 (FIG. 1). In yet another preferred embodiment, the port connector 132 comprises an infrared transmitter/receiver for wireless coupling to the infrared port 106 (FIG. 1) of the SUT 100 (FIG. 1). In yet another preferred embodiment, the port connector 132 comprises a 68 pin male connector for coupling to the PC Card® port of a notebook computer, such as the Micron™ Millenia Transport™ or the IBM® ThinkPad®. In yet another preferred embodiment, the port connector 132 comprises a Universal Serial Bus (USB) connector, Series A or Series B, having eight conductors.

FIG. 3b illustrates the standard pin assignments for a parallel port 104 (FIG. 1) having a DB-25 female connector for coupling to the port connector 132 comprising a DB-25 male connector. In a preferred embodiment, the system monitor 122 (FIG. 2) communicates signals indicating the burn-in status of the SUT 100 (FIG. 1) to the status indicator 126 using data pins of the parallel port 104 (FIG. 1). As shown in FIG. 3b, the data pins are the second through ninth pins of the parallel port (pins 2 –9). Note also that the ground pins are the eighteenth through twenty fifth pins. In a preferred embodiment, the system monitor 122 (FIG. 2) may use any three distinct data pins, such as the third pin 140, the fourth pin 142 and the fifth pin 144, to communicate the signals indicative of the burn-in test status to the visual display elements 134, 136, 138.

In a preferred embodiment, the visual display elements 134, 136, 138 comprise colored LEDs having cathode and anode terminals. To assemble the status indicator 126, the cathode terminal of a LED is electrically connected to a data pin and the anode terminal is electrically connected to a ground pin. Thus, in the preferred embodiment, the cathode of the red LED 138 is electrically connected to pin 3 and its anode is electrically connected to pin 23 in the port connector 132. Similarly, the cathode of the yellow LED 136 is electrically connected to pin 4 and its anode is electrically connected to pin 24 while the cathode of the green LED 134 is electrically connected to pin 5 and its anode is electrically connected to pin 25 of the port connector 132. As is well known in the art, one may similarly assemble a status indicator 126 having a port connector 132 comprising a DB-9 female connector for coupling to a serial port 102 (FIG. 1) of the SUT 100 (FIG. 1).

Figure 4:
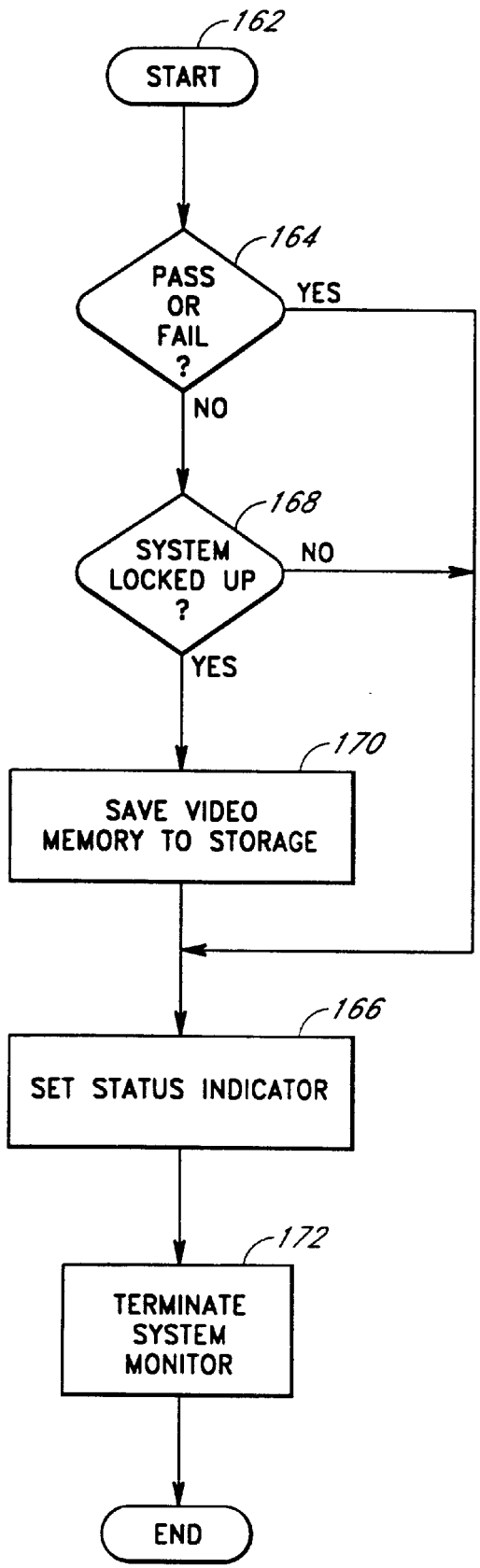
FIG. 4 is a flowchart illustrating the process flow of the monitor system of FIG. 2.

Referring now to FIG. 4, a flowchart 160 illustrates the process flow of the system monitor 122 (FIG. 2) of the present invention. At state 162, the computer manufacturer invokes the system monitor 122 to initialize and prepare the monitor system 120 (FIG. 2) for burn-in test monitoring. In a preferred embodiment, the system monitor 122 is a MS-DOS® TSR invoked by entering on the command line the TSR name followed by a parameter specifying a time. For example, the entry "LEDTSR 15" on the MS-DOS® command line invokes a TSR called "LEDTSR" and passes the parameter "15" indicating to "LEDTSR" to check for a frozen state every 15 minutes. After initialization, the system monitor 122 proceeds to state 164 where it determines the status of burn-in testing by finding a pass value or a fail value in a selected memory location of the SUT 100 (FIG. 1). In a preferred embodiment, the pass value is the byte "42 h", the fail value is the byte "24 h" and the selected memory location is the address "40:F0 h". If the pass value or the fail value is found at state 164, the system monitor 122 proceeds to state 166 where it sets the status indicator 126 for visual display by communicating the appropriate signals. For example, in a preferred embodiment, the system monitor 122 at state 166 communicates a signal to illuminate the green LED 134 (FIG. 3a) for a pass value. Similarly, at state 166, the system monitor 122 communicates a signal to illuminate the red LED 138 (FIG. 3a) for a fail value.

The use of pass and fail values provides flexibility in the use of the system monitor 122 (FIG. 2) by burn-in test programs. For example, when a SUT 100 (FIG. 1) completes a burn-in test successfully, it may idle for some period of time before a manufacturing operator notes a pass condition and transfers the SUT 100 (FIG. 1) to the next operation. Although the SUT 100 (FIG. 1) has completed burn-in testing successfully, the system monitor 122 (FIG. 2) may inadvertently interpret its idle condition as a locked-up "frozen" state. To prevent this inadvertent determination, the burn-in test program communicates success or failure to the system monitor 122 (FIG. 2) by writing a pass or fail value into a selected memory location. The system monitor 122 then checks the selected memory location for the pass or fail value, sets the status indicator accordingly and terminates.

However, if the pass value or the fail value is not found at state 164, the system monitor 122 proceeds to state 168 to determine if the SUT 100 (FIG. 1) is in a locked up or "frozen" state. If the SUT 100 (FIG. 1) is in a locked up state, the system monitor 122 proceeds to state 170 where it saves selected portions of the video memory of the SUT 100 to the storage element 124 for later analysis. Otherwise, the system monitor 122 proceeds to state 166 where it sets the status indicator 126 to indicate that the burn-in test is still in progress. For example, in a preferred embodiment, the system monitor 122 communicates a signal to illuminate the yellow LED 136 (FIG. 3a) to indicate that the burn-in test is still in progress. In another preferred embodiment, the system monitor 122 communicates a blinking signal at 166 to illuminate the yellow LED 136 (FIG. 3a) in a blinking fashion to indicate that the burn-in test is still in progress.

After setting the status indicator 126 at state 166, the system monitor 122 proceeds to state 172 and terminates. Although the system monitor 122 terminates, it remains active in the memory of the SUT 100.

Figure 5:
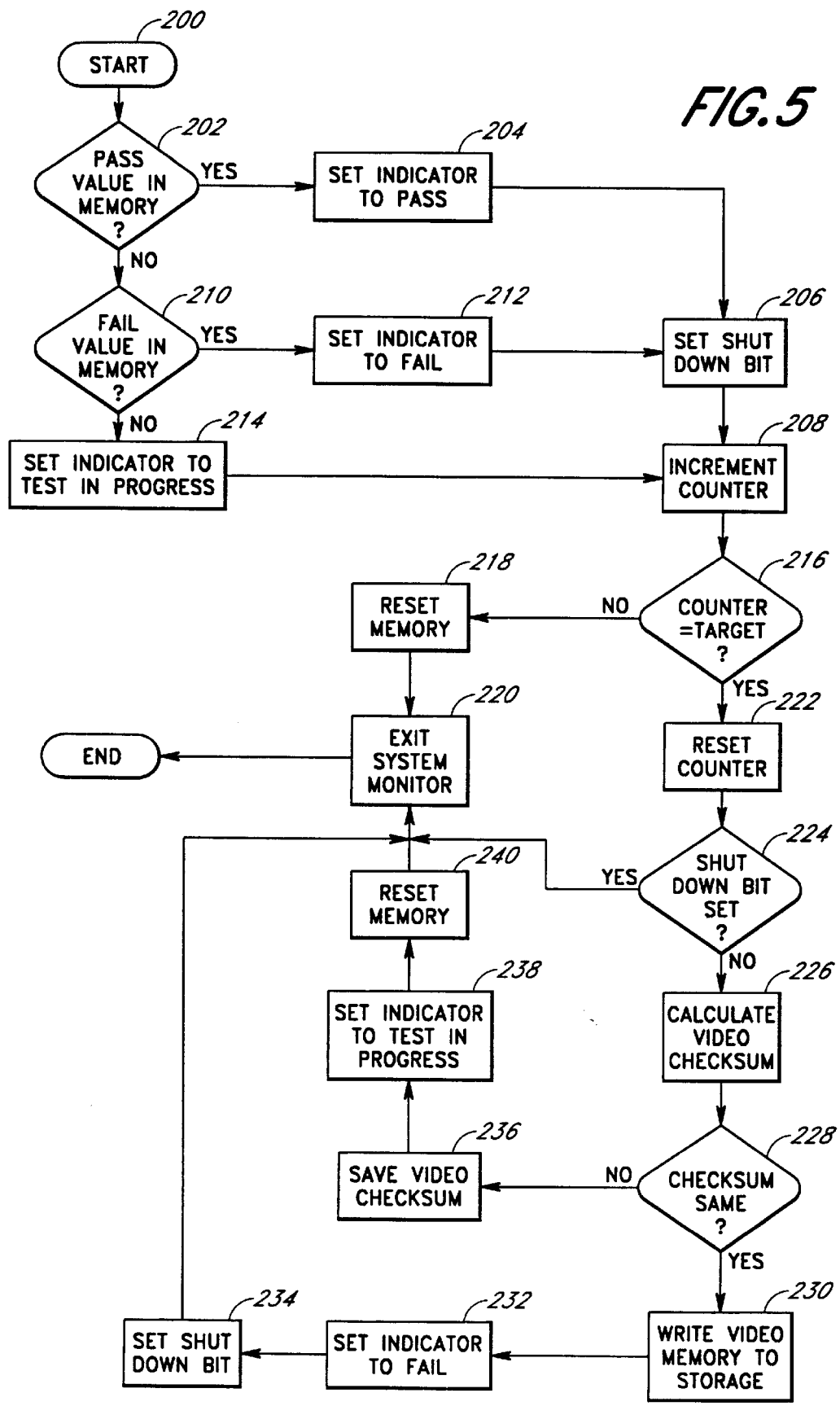
FIG. 5 is a flowchart illustrating a preferred embodiment of the process flow of FIG. 4.

Referring now to FIG. 5, a flowchart illustrates the process flow of a preferred embodiment of the system monitor 122 (FIG. 2) of the present invention. As noted above, in the preferred embodiment, the system monitor 122 is a MS-DOS® TSR, LED TSR (Version 2.0), hereinafter referred to as LEDTSR, invoked by entering on the command line LEDTSR followed by a parameter specifying a time. For reference, the appendix includes the program code, written in the MICROSOFT® assembler, to implement the LEDTSR system monitor.

As discussed previously, the computer manufacturer invokes LEDTSR at state 200 to initialize and prepare the monitor system 120 (FIG. 2) for burn-in test monitoring. At state 200, LEDTSR initializes, among other things, the memory location "40:F0 h", the counter and the video checksum, and performs a functionality check on the status indicator 126 to ensure that its visual display elements 134, 136, 138 are functioning. In addition, LEDTSR references the real time clock of the SUT 100 (FIG. 1) for use in calculating elapsed time.

LEDTSR then proceeds to state 202 where it checks the memory location 40:F0 h for the pass value 42 h. If the pass value is found at state 202, LEDTSR proceeds to state 204 where it sets the status indicator 126 to indicate a pass condition. For example, in a preferred embodiment, LEDTSR illuminates the green LED 134 (FIG. 3a) at state 204. After setting the status indicator 126, LEDTSR then sets the shut down bit at state 206 and increments the counter at state 208. If the pass value is not found at state 202, LEDTSR proceeds to state 210 to determine if the fail value 24 h exists in memory location 40:F0 h. If the fail value is found at state 210, LEDTSR proceeds to state 212 where it sets the status indicator 126 to indicate a fail condition. For example, in a preferred embodiment, LEDTSR illuminates the red LED 138 (FIG. 3a) at state 212. As before, after setting the status indicator 126, LEDTSR sets the shut down bit at state 206 and increments the counter at state 208. If the fail value is not found at state 210, LEDTSR proceeds to state 214 where it sets the status indicator 126 to indicate a test in progress condition. For example, in a preferred embodiment, LEDTSR illuminates a yellow LED 136 (FIG. 3a) at state 214. In another preferred embodiment, LEDTSR illuminates a yellow LED 136 (FIG. 3a) at state 214 in a blinking fashion. Afterwards, LEDTSR increments the counter at state 208.

At state 216, LEDTSR compares the counter to a target value calculated from the time parameter used to invoke LEDTSR at state 200. If the target exceeds the counter, LEDTSR proceeds to state 218 where it resets memory location 40:F0 h in preparation to exit LEDTSR at state 220. Otherwise, the counter exceeds the target at state 216 and LEDTSR proceeds to determine if a time out condition resulting from a SUT 100 (FIG. 1) lock up exists. LEDTSR next proceeds to state 222 where it resets the counter and then moves to state 224 to determine the status of the shut down bit If the shut down bit has been set, LEDTSR proceeds to state 220 to exit. Otherwise, LEDTSR proceeds to state 226 and calculates a video checksum indicative of whether video memory locations corresponding to monitor outputs are changing. To calculate the video checksum, LEDTSR adds up the values of all of the characters and attributes in the video memory. A character refers to a byte stored in an even numbered address of video memory whereas an attribute refers to a byte stored in a corresponding odd numbered address of video memory.

For example, if address B800:0 contains a value 41 h, this corresponds to the character 'A', while address B800:1, containing a value 7 indicative of standard MS-DOS® gray text color on a black background, corresponds to the attribute for the character in address B800:0. Similarly, the video memory addresses for a screen in VGA mode starts at B800:0 and extends to B800:0FA 0 for display of text in 80 ×25 format LEDTSR calculates the video checksum by adding the values of the characters and attributes stored in addresses B800:0 (row 0, column 0) to B800:0FA0(row 25, column 80). After calculating the video checksum at state 226, LEDTSR moves to state 228 and compares the calculated checksum against the prior value of the checksum. The comparison at state 228 enables LEDTSR to determine if the SUT 100 is in a locked up frozen state.

If SUT 100 is in a locked up state, the checksum of the video memory locations corresponding to the monitor outputs remains the same. Thus, if the checksum is the same at state 228, LEDTSR proceeds to state 230 where it writes the video memory locations to the storage element 124 (FIG. 2). LEDTSR then moves to state 232 where it sets the status indicator 126 to indicate a fail condition. Following this, LEDTSR moves finally to state 234 where it sets the shut down bit prior to terminating at state 220. In a preferred embodiment, LEDTSR illuminates the red LED 138 (FIG. 3a) at state 232. If at state 228 LEDTSR determines the checksum is not the same, it proceeds to state 236 where it saves the calculated checksum value for the next pass. LEDTSR then proceeds to state 238 where it sets the indicator 126 to indicate a test in progress condition. Finally, LEDTSR moves to state 240 where it resets the memory prior to terminating at state 220.

In contrast to available alternatives, the present invention functions cooperatively with existing diagnostic and burn-in text programs and with any type of computer equipment having external communication ports, such as a universal serial bus or a serial, parallel or infrared port. The present invention likewise provides a cost effective, efficient mechanism to display the status of computer equipment under test without an expensive computer display. Moreover, in contrast to existing systems, the present invention enables the capture of information related to failure conditions of a system under test in local or network storage for later diagnosis. Lastly, the present invention is also useful for detecting a locked-up or "frozen" state resulting from a failure of the computer equipment to pass a self test and boot after power up.

Those skilled in the art may practice the principles of the present invention in other specific forms without departing from its spirit or essential characteristics. Accordingly, the disclosed embodiments of the invention are merely illustrative and do not serve to limit the scope of the invention set forth in the following claims.

APPENDIX

LED TSR/device driver for burn in.
© 1996 Micron Electronics, Inc. (unpublished) All rights reserved.

```
;================================================================
;       EQUATES
;================================================================
ISR EQU 1Ch                         ;this is the interrupt you want to chain into.
NONE EQU 0                          ;no color (leds off)
GREEN EQU 4                         ;led colors
YELLOW EQU 2
RED EQU 1
LOCKLED EQU RED                     ;every LED color.
VID_SEG EQU 0B800h                  ;segment of video memory
TRUE EQU 1
FALSE EQU 0
DRIVE_NUM EQU 80h                   ;drive C:
START_SEC EQU 10                    ;starting sector #
START_CYL EQU 0                     ;cylinder 0
START_HED EQU 0                     ;starting head number
FAILED EQU 24h                      ;magic failed flag
PASSED EQU 42h                      ;passed flag
WORKING EQU 11h                     ;working flag
MAGIC_SEG EQU 0040h                 ;segment:offset of magic byte location
MAGIC_OFF EQU 0F0h
ONE_MINUTE EQU 60*18                ;time value 60 sec=1 minute, 18=clock ticks/sec
;--------------------
;================================================================
;       Initializing, segment setup, structures
;================================================================
CSEG SEGMENT
    ASSUME CS:CSEG, DS:NOTHING, ES:NOTHING
    ORG 0000H                       ;For all device drivers
Header DD -1                        ;One device
    DW 08000H                       ;Character device
StratA DW Strat                     ;Strategy entrance
IntrA DW Intr                       ;Interrupt entrance
    DB 'LEDTSR|'                    ;8 character dummy name
new_int:
    nop                             ;insert nops as a crude ID to detect
    pushf                           ;if TSR is already installed.
    nop                             ;
    call dword ptr cs:keep_ofs      ;first thing, do the actual ISR
    push ax                         ;retain whatever registers we played with
    push bx                         ;
    puxh cx
    puxh dx
    puxh si
    pushf
    cmp byte ptr cs:[shutdown],TRUE ;test if TSR is shut down
    jz do_counter                   ;if so, only do blinks
    push es
    push MAGIC_SEG
    pop es
    mov al,byte ptr es:[MAGIC_OFF]  ;save magic value in AL
    pop es
    cmp al,FAILED
    jz go_red
    cmp al,PASSED
    jz go_green
    cmp al,WORKING
    jnz do_counter
go_yellow:
    mov byte ptr cs:[led_color],YELLOW
    jmp do_counter
go_red:
    mov byte ptr cs:p[led_color],LOCKLED ;All LEDs on for locks
    mov byte ptr cs:[shutdown], TRUE
    jmp do_counter
go_green
    mov byte ptr cs:[led_color], GREEN
    mov byte ptr cs:[shutdown],TRUE
    ;add 1 to our counter, check if it's time to react
do_counter:
    inc word ptr cs:[counter]
    mov ax,cs:[counter]
    cmp ax,cs:[TIME]                ;have we hit the determined time?
    jae checksum                    ;if we're there or there+, reset it!
    test ax,1                       ;odd or even value? (bit 0)
    mov al,FALSE                    ;set up off color
    jz output_led                   ;unless its even value
```

APPENDIX-continued

```
    mov al,byte ptr cs:[led_color]      ;set up LED output color
output_led:
    ;output a color to the LPT port. AL=color
    push es                             ;read LPT port from BIOS data area.
    push 040h
    pop es
    mov dx,word ptr es:[8]
    pop es
    out dx,al
    jmp quit_tsr
checksum:
    mov word ptr cs:[counter],0         ;reset counter to zero
    cmp byte ptr cs:[shutdown],TRUE     ;test if TSR is shut down
    jz quit_tsr
    push es
    mov ax,MAGIC_SEG
    mov es,ax
    cmp byte ptr es:[MAGIC_OFF],WORKING ;are we still working?
    mov byte ptr es:[MAGIC_OFF],FALSE   ;reset it to 0
    pop es
    jz quit_tsr
    ;check our status
    ;do a checksum of the VGA video region B800 for 4000 bytes
    ;25rows * 80columns * 2chars per column (char and attribute)
    mov ax,VID_SEG
    mov ds,ax
    mov si,0
    xor bx,bx
    mov cx,4000
chksum:
    lodsw
    add bx,ax
    loop chksum
    cmp bx,word ptr cs:[oldchksum]      ;check sum vs old checksum
    mov word ptr cs:[oldchksum],bx      ;save new sum
    jnz quit_tsr                        ;exit(value is still 'working')
    ;we have a locked up computer!
    mov byte ptr cs:[shutdown],TRUE     ;set shutdown flag
    mov byte ptr cs:[led_color],LOCKLED ;turn on all LED colos!!
    ;write 8 sectors of stuff to the hard drive starting at sector 10
    ;80 columns * 25 rows * 2 bytes per character / 512 bytes per sector
    push es
    mov ax,0308h                        ;function 3, write sectors 8 sectors
    mov bx,VID_SEG                      ;set ES:BX to point to buffer B800:)
    mov es,bx
    mov bx,0
    mov ch,START_CYL
    mov cl,START_SEC
    mov dh,START_HED
    mov dl,DRIVE_NUM
    int 13h                             ;interrupt 13h, write it baby!
    pop es
quit_tsr;
    ;check if external 'working' flat set
    ;don't reset it if it is
    push es
    mov ax, MAGIC_SEG
    mov es,ax
    cmp byte ptr es:[MAGIC_OFF], WORKING
    pop es
    jz nomagicreset
    ;reset magic value back to 0
    push es
    mov ax, MAGIC_SEG
    mov es,ax
    mov byte ptr es:[MAGIC_OFF],FALSE   ;reset it to 0
    pop es
nomagicreset:
    popf
    pop si
    pop dx
    pop cx
    pop bx                              ;restore them registers we played with
    pop ax                              ;
    iret                                ;finish up with IRET
;================================================================
;       DATA
;================================================================
dummy1 db 90h                           ;Unused storage
```

APPENDIX-continued

```
keep_ofs  dw 9090h              ;segment:offset of true ISR vector
keep_seg  dw 9090h              ;
dummy2    db 90h                ;Unused storage
oldchksum dw 4444h              ;storage for old checksum value
shutdown  db 0                  ;storage flag for lockup
counter   dw 111h               ;clock tick counter
time      dw 2134h              ;timer value
led_color db YELLOW             ;current LED color (start off at working)
finish    equ $                 ;finish flag so we know where the last
                                ;byte of our program is.
;==================================================================
;Device Driver startup code. Stuff below here makes it go TSR
;==================================================================
IOPacket STRUC
IO_CMDLEN DB ?
IO_UNIT   DB ?
IO_CMD    DB ?
IO_STATUS DW ?
    DB 8 DUP(?)
IO_MEDIA  DB ?
IO_ADDRESS DW ?
    DW ?
IO_COUNT  DW ?
IO_START  DW ?
IOPacket ENDS
Init PROC FAR
    ASSUME DS:NOTHING, ES:NOTHING
Packet DD 0                     ;Request packet address
Strat:
    MOV WORD PTR Packet, BX     ;Save Packet info
    MOV WORD PTR Packet+2,ES
    RET
usage_msg db "Hey bub, you are missing a command line argument.", 10,13
    db "This command line argument is for the number of minutes to wait between lock-
    ",10,13
    db "up checks. Maximum is 60 minutes. Try again.",10,13,"$"
already db "Whoa! This TSR thing is already installed.",10,13
    db "You will need to reboot this computer in order to load it again.",10,13,"$"
: Note: Put initialization code here.
; Save all registers used except DS & BX.
: After code, restore same registers and
; JMP to "Exit".
; Initialization Procedure
; -----------
Intr:
    PUSH EX                     ;Save registers
    PUSH DS
    LDS BX,DWORD PTR Packet
    LDS SI,DWORD PTR [BX+IO_COUNT]
    SUB BX,BX                   ;Zero counter
    push ax
    push cx
    push dx
    push si
    pushf
findstart:
    lodsb
    cmp al,0dh
    jz usage
    cmp al,0ah                  ;read until we hit something
    jz usage
    cmp al," "
    jnz findstart
Bypas:
    LODSB                       ;Get CMD character
    cmp al,0dh                  ;read until we hit something
    jz usage
        cmp al,0ah              ;read until we hit something
    jz usage
    cmp al,20h
    jz bypass
    dec si
    xor cx,cx                   ;start counter
next:
    lodsb
    inc cl
    cmp al,"0"
    jl done
    cmp al,"9"
```

APPENDIX-continued

```
        jl next
done:
    sub si,cx
    dec cl
    call dechex
    cmp ax,60
    jg usage
    cmp ax,0
    je usage
    mov bx,ONE_MINUTE          ;calculate actual # of clock ticks for_
    mul bx                     ;time desired.
    mov word ptr cs:[time],ax  ;save value
    jmp install
proc DECHEX                    ;THIS ROUTINE WILL TAKE A [CL](MAX 5)DIGIT
                               ;ASCII DECIMAL NUMBER POINTED TO BY SI
                               ;AND RETURN A 4 DIGIT HEX NUMBER IN AX*
        XOR DH,DH
        XOR AX,AX
TRY: CMP CL,1
        JBE LAST
        MOV DL,[SI]
        SUB DL,"0"
        cmp dl,"0"             ;abort if # isn't decimal
        ja usage               ;sneaky way out! oh well!
        ADD AX,DX
        MOV BX,AX
        SHL AX,1
        SHL AX,1
        SHL AX,1
        ADD AX,BX
        ADD AX,BX
        INC SI
        LOOP TRY
LAST: MOV DL,[SI]
        SUB DX,"0"
        cmp dl,"0"             ;abort if # isn't decimal
        ja usage               ;sneaky way out! oh well!
        ADD AX,DX
        RET
dechex endp
usage:
    push ds
    push cs
    pop ds
    lea dx,usage_msg
    mov ah,9
    int 21h
    pop ds
        cmp cs:EXEPacket.IO_COUNT,00081H
        jnz exit
    mov ah,4ch
    int 21h                    ;quit!
already_installed:
    push ds
    push cs
    pop ds
    lea dx,already
    mov ah,9
    int 21h
    pop ds
        cmp cs:EXEPacket.IO_COUNT,00081H
        jnz exit
    mov ah,4ch
    int 21h                    ;quit!
install:
    mov ah,35h                 ;get vector function
    mov al,ISR                 ;place interrupt # here.
    int 21h                    ;
    cmp word ptr es:[bx],9c90h
    jnz loadok
    cmp word ptr es:[box+2],2e90h
    jz already_installed
loadok:
    mov keep_seg,es            ;save the old vectors
    mov keep_ofs,bx            ;
    lea dx,new_int             ;load dx with the new routine
    push cs
    pop ds
    mov ah,25h
```

APPENDIX-continued

```
    mov al,ISR                      ;place interrupt # here.
    int 21h                         ;set new vector
    MOV DX,OFFSET Message           ;Show installed message
    MOV AH,009H
    INT 021H
    JMP SHORT EXIT
message db "LEDTSR installed",10,13,"$"
Exit:
    popf
    pop si
    pop dx
    pop cx
    pop ax
    ASSUME DS:NOTHING, ES:NOTHING
    LDS BX,DWORD PTR Packet         ;Restore Packet info
    MOV WORD PTR [BX+IO_ADDRESS],OFFSET Init ;Set memory
;       Note: Change "Init" above to correct ending address
    MOV WORD PTR [BX+IO_ADDRESS+2],CS ;to be resident
    MOV[BX⇋IO_STATUS],00100H        Set done bits
    POP DS                          ;Restore registers used
    POP BX
    RET                             ;Exit device installation
Init ENDP
; Delete lines containing "ENDS" and "END" above.
EXEPacket IOPacket <>               ;Requires packet space
Start PROC NEAR                     ;Execute DDD installation
    MOV SP,OFFSET StackTop          ;Shorten stack
    PUSH ES                         ;Save PSP segment
    MOV AH,049H                     ;Release environment
    MOV ES,ES:0002CH
    INT 021H
    PUSH CS                         ;DS = CS
    POP DS
    ASSUME DS:CSEG
    POP AX                          ;ES:0081 = Command string
    MOV EXEPacket.IO_COUNT+2,AX     ;Put address in packet
    MOV EXEPacket.IO_COUNT,00081H
    SUB AL,AL                       ;0 = Initialize DDD
    MOV EXEPacket.IO_CMD,AL         ;Put command in packet
    MOV BX,OFFSET EXEPacket         ;ES:BX = packet address
    PUSH CS
    POP ES
    ASSUME ES:CSEG
    PUSH CS                         ;FAR return
    CALL StratA                     ;Perform strategy
    PUSH CS                         ;FAR return
    CALL IntrA                      ;Perform interrupt
    MOV DX,EXEPacket.IO_ADDRESS     ;Get ending address
    ADD DX,0010FH                   ;Add PSP and round up
    MOV CL,4                        ;Convert to paragraphs
    SHR DX,CL
    MOV AX,03100H                   ;DOS stay resident function
    INT 021H
        DW 080H DUP (?)
StackTop DW 0
Start ENDP
CSEG ENDS
    END Start
```

What is claimed is:

1. A method of indicating the status of computer equipment undergoing testing, said computer equipment having an internal memory, comprising:

determining whether the computer equipment has passed or failed a test by monitoring at least one address within the internal memory of said computer equipment;

determining whether the computer equipment has failed to respond to the test prior to conclusion of the test by periodically calculating a value derived from data stored in at least one address within said internal memory;

storing information indicative of at least one condition of the computer equipment into a storage element when the computer equipment has failed to respond to the test based on said periodically calculated value;

producing a status signal in response to a pass condition, a fail condition, or a test in progress condition; and visually displaying a representation of the status of the computer equipment in response to said status signal.

2. The method of claim 1, further comprising the step of analyzing the information indicative of the condition of the computer equipment to determine a failure mode.

3. The method of claim 1, wherein the step of determining whether the computer equipment has passed or failed a test comprises comparing a value selected from video memory with predetermined hexadecimal values indicating passing or failing the test, respectively, to determine whether the computer equipment has concluded the test, said value selected from said video memory being obtained from an address within said video memory where display data indicative of the status of said test is stored by a test algorithm.

4. The method of claim 1, wherein the step of determining whether the computer equipment has failed to respond to the test comprises determining whether a checksum calculated from the bits stored in a plurality of predetermined memory locations has changed over a predetermined period of time, at least one of said plurality of predetermined memory locations corresponding to at least one address where display data indicative of the status of said test is stored.

5. The method of claim 1, wherein the step of visually displaying a representation of the status comprises activating at least one colored light emitting diode.

6. A method of indicating the test status of computer equipment having a memory, comprising:

comparing a value selected from a memory with a predetermined hexadecimal value to determine the status of a test of the computer equipment, said value selected from a memory being obtained from an address within said memory where display data indicative of the status of said test is stored;

determining whether a checksum calculated from the bits stored in at least one predetermined memory location has changed;

storing information indicative of at least one condition of the computer equipment into a storage element when the computer equipment has failed to respond as indicated by the checksum not changing;

producing a status signal in response to said status of the test; and visually displaying a representation of the status of the test of the computer equipment in response to said status signal.

7. The method of claim 6, further comprising the step of analyzing the information indicative of at least one condition of the computer equipment to determine a failure mode.

8. The method of claim 6, wherein the step of visually displaying a representation of the status comprises activating at least one colored light emitting diode.

9. A method of indicating the burn-in test status of computer equipment having an internal video memory, comprising:

initiating a test algorithm resident on said computer equipment;

comparing a value selected from a memory to predetermined hexadecimal values to determine whether said burn-in test of the computer equipment is in progress or whether the computer equipment has concluded said test by passing or failing the test, said value selected from a memory being obtained from an address within said internal video memory where display data indicative of the status of said burn-in test is stored by said test algorithm;

incrementing a counter to indicate a period of time corresponding to burn-in test operation;

determining whether the counter value has reached a target value indicating that the computer equipment has completed the test;

determining whether a checksum calculated from the bits stored in at least one predetermined video memory location has changed when the counter value exceeds the target value;

storing information indicative of the condition of the computer equipment into a storage element when the computer equipment has failed to respond as indicated by the checksum not changing;

producing a status signal in response to a pass condition, a fail condition, or a test in progress condition; and visually displaying a representation of the status of the computer equipment in response to said status signal.

10. The method of claim 9, further comprising the step of analyzing the information indicative of at least one condition of the computer equipment to determine a failure mode.

11. The method of claim 9, wherein the step of visually displaying a representation of the status comprises activating at least one colored light emitting diode.

* * * * *